Oct. 14, 1930.                    J. S. PEOPLES                    1,778,508
                   APPARATUS FOR MEASURING AND RECORDING PRESSURES
                              Original Filed Oct. 20, 1925
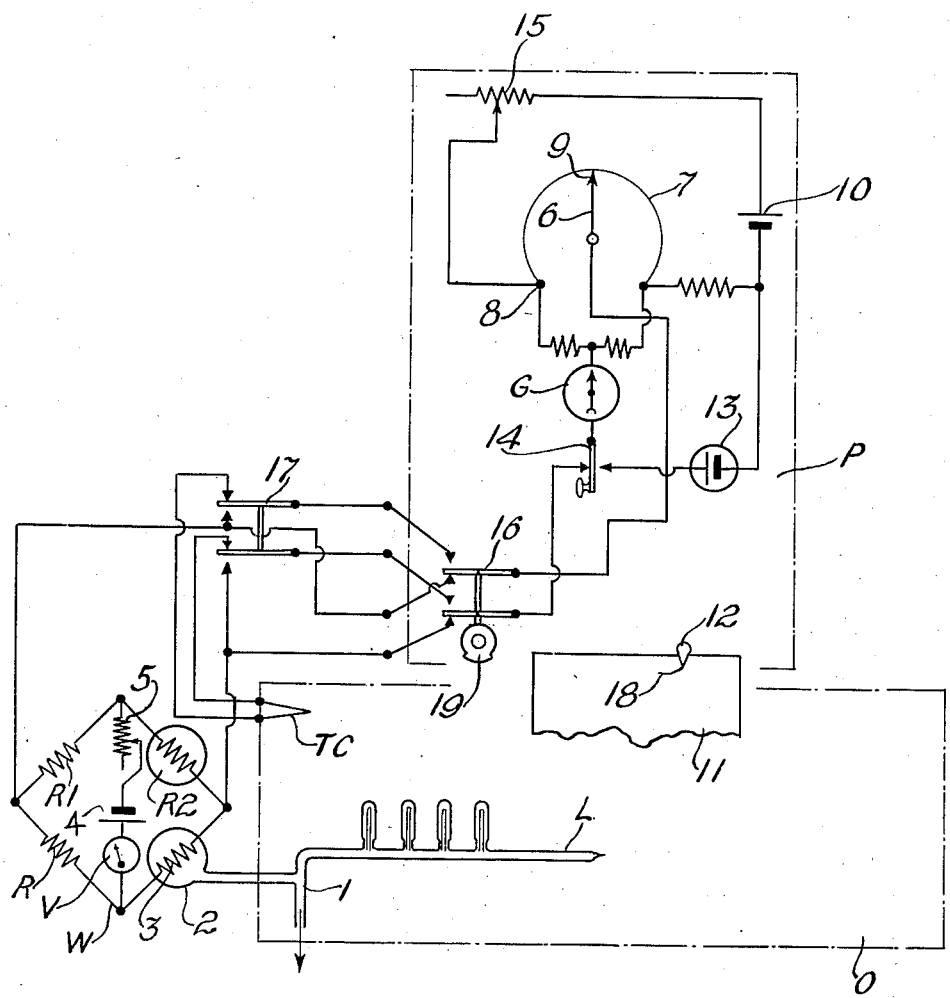
Inventor
John S. Peoples
by [signature]
Atty.

Patented Oct. 14, 1930

1,778,508

UNITED STATES PATENT OFFICE

JOHN SHERMAN PEOPLES, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR MEASURING AND RECORDING PRESSURES

Application filed October 20, 1925, Serial No. 63,578. Renewed April 27, 1929.

This invention relates to improvements in apparatus for measuring and recording pressures, and more particularly to apparatus for continuously measuring and recording variations in vacuum.

An object of this invention is to provide an improved apparatus for accurately measuring and recording pressures and variations therein under widely varying atmospheric or other attendant conditions.

Another object of this invention is to provide an apparatus for recording the pressures and the temperatures of a pressure system.

In the manufacture of incandescent lamps, and particularly of the small telephone switchboard type, the lamps are mounted in banks along on main tubes, and exhausted and then sealed as they are melted off the main exhaust tube while the vacuum is maintained in the remainder of the lamps. Sometimes in sealing off the individual lamps the main tube becomes unsealed and the vacuum drops so that subsequent lamps sealed off are defective until the drop in vacuum is discovered, thus resulting in so-called rejects.

Apparatus has been proposed for making a continuous record of the vacuum maintained and preferably in the form of a chart having a vacuum recording line drawn thereon while the apparatus is in use. Thus not only does the operator have the instrument continually indicate the vacuum, but a record chart is made which is useful for various purposes.

Such a system or apparatus is shown in an application of I. G. Barber and C. A. Borland, Serial No. 63,593, filed Oct. 20, 1925, and contemplates the use of a Wheatstone bridge circuit having suitable resistances in three of its arms and a tube encased resistance in the fourth arm, which tube is connected with the lamp bank exhausting tube, and which latter resistance varies with changes in the vacuum, said bridge being associated with a suitable recording instrument in the form of a recording potentiometer affected by variations in the bridge circuit so as to record any variations in the vacuum.

My invention is directed to an improvement in the measuring circuit in which I provide a more sensitive and accurate instrument, balancing out certain of the variables by employing a standard filament enclosing evacuated tube in one arm of the bridge circuit, instead of the Manganin coil heretofore used. This standard or comparing tube is similar to and exposed to substantially the same conditions as the gauge or measuring tube which is in another arm of the bridge and both are, therefore, subject to the same atmospheric and room temperature conditions.

In the accompanying drawing I show a preferred form of my invention, in which the general arrangement is shown diagrammatically.

In the illustration I show in general an oven O in which the incandescent lamps being exhausted are heated to expedite the removal of gases therefrom, a Wheatstone bridge circuit arrangement W for measuring the variations in resistance of an element included in the vacuum chamber, and a suitable recording instrument affected by variations in the bridge circuit, this latter instrument being preferably a curve drawing recorder or recording potentiometer P and preferably a Leeds & Northrup two-point curve drawing recorder, which is of the type shown in Reissue Patent 15,597, issued May 15, 1923 to H. Brewer.

Referring in general to the system or apparatus employing my invention, one arm of the bridge includes a platinum wire sealed in the gauge connected with the exhaust system. Changes in vacuum in the exhausting system will vary the resistance of the wire and unbalance the bridge and the potentiometer will immediately be automatically adjusted to restore the balance in the bridge and will record the changes necessary to balance the bridge, thereby in effect recording the variations taking place in the vacuum system.

Referring now more in detail to the apparatus as illustrated, the oven O may be of any suitable type, such as an electrically heated oven in which banks L of incandescent lamps are supported and connected to a suitable vacuum pipe or system (not shown) so as to exhaust the same during the process of manufacture. These lamps L as the treatment is completed, are sealed off the main tube, removing them one by one. During this operation the lamp are melted off the main glass tube and simultaneously sealed, so that the lamp is sealed while exhausted and also the connection from the exhaust tube so that the vacuum is maintained in a main carrying tube 1. This main tube 1 is extended to a vacuum chamber 2, preferably of glass, carrying a suitable resistance conductor 3 fed by current from the Wheatstone bridge W, which is used for measuring the variations in resistance of the element 3 resulting from variations of pressure in the vacuum system. I preferably use a wire which has a high temperature co-efficient of electrical resistance, and find that a platinum wire sealed in the system being evacuated gives very satisfactory results.

The Wheatstone bridge circuit employed has suitable resistances R, R$^1$ and R$^2$, properly proportioned as compared with the measuring element 3 so that there will be no current flow from the battery 4 through galvanometer G when a balance is reached.

In this bridge circuit the resistances R and R$^1$ are preferably Manganin coils and the comparing resistance R$^2$ is a standard evacuated tube with platinum filament and constructed like, and mounted so as to be exposed to substantially the same conditions as the gauge or measuring tube 2 in the bridge circuit. Preferably these should be mounted close together near the other apparatus, so as to be exposed to the same atmospheric and room temperature conditions whereby both tubes are similarly affected by outside conditions.

In the measurement of the vacuum or pressure, that is, the recording of the variations therein, I employ, as stated, resistance wire to be enclosed in the vacuum chamber being measured. The walls of this chamber surrounding the resistance element are preferably maintained at a substantially constant normal temperature, such as ordinary room temperature in which the work is being carried on. With this wire connected to a source of constant electro-motive force, the temperature of the wire rises until a state of equilibrium is reached, that is, in which the continuous dissipation of the thermal-energy is equal to the electrical energy supplied to the wire. This dissipation of thermal-energy comes from radiation, by conduction through the connections through the chamber to the wire, by the thermal convection, that is, by dissipation through the currents of gas circulating in the atmosphere surrounding the wire, and by conduction through the gas. By carefully designing the tube or chamber 2 in which the element 3 is carried, substantially all loss of heat except by conduction through the gas or air surrounding the wire can be reduced to a small proportion of the whole loss or whole conduction. Therefore, with an efficient tube the equilibrium temperature attained by the resistance wire 3 will depend mainly upon the ability of the gas or air surrounding the wire element 3 to conduct away the heat, an equilibrium temperature being higher when the gas or air has a low conductivity and lower when the gas or air has a high conductivity. With a wire having a high temperature co-officient of electrical resistance, this resistance will have a value corresponding to the thermal conductivity, and therefore to the pressure of the chamber in which it is enclosed.

A suitable voltage regulator 5 and an associated indicating voltmeter V are employed in connection with the Wheatstone bridge, and, as stated, the galvanometer G affected by the bridge is located at the recording potentiometer P and acts to control a wiper 6 in contact with a slide wire 7, which is of uniform resistance throughout its length. By moving the wiper 6 along the slide wire a point is found where the potential between points 8 and 9 in the slide wire, from battery 10, is just equal to the counter electro-motive force supplied from the battery 4 of the Wheatstone bridge W. This action of the wiper 6 is brought about through well-known driving mechanism in the potentiometer under the control of the galvanometer G, the needle of which is deflected one way or the other, and to an extent depending upon the effect produced by the resistance 3.

The potentiometer also has its recording chart 11 and recording pen 12 operated in a well-known manner. That is, the chart 11 is being advanced past the pen 12 while the apparatus is in operation, and the pen 12 is shifted to record a line on the chart 11 according to the adjustment of the wiper 6, thereby recording on the chart the variations of vacuum in the lamp system being exhausted.

In the potentiometer, the usual standard cell 13 is shown, which may be included in circuit by pressing the lever 14 so as to standardize the voltage from the battery 10 by adjusting the variable rheostat 15.

In the illustration I have shown a two-point recording potentiometer adapted to be shifted from the vacuum recording side to a thermo-couple TC so as to also record the variations in temperature in the oven, said Wheatstone bridge and thermo-couple being alternately connected for predetermined periods through the circuit changer 16, which is operated in synchronism with the recorder mechanism as is well-known. I have also shown an automatic oven door switch 17 adapted to cut out the thermo-couple when the oven door is opened so as to record the vacuum at that time. However, the part of the system including the control through the switch 17 and the results accomplished thereby, are not my invention but are the subject matter of a copending application of A. F. Melching, Serial No. 63,587, filed Oct. 20, 1925.

Referring now to the operation of my improved apparatus as illustrated, assuming that the oven O has been brought up to the desired temperature, the exhaust system 1 brought to the proper degree of vacuum, the voltage impressed across the Wheatstone bridge adjusted correctly to a predetermined value, the filament or measuring resistance 3 glowing and the bridge and potentiometer all in balance, the pen 12 will indicate on the chart 11 a certain degree or desired vacuum.

Assuming now that the vacuum in the system 1 changes, this change causes a variation of the air or gas in the chamber 2, thereby affecting the resistance of the measuring element 3 to unbalance the Wheatstone bridge circuit W in which the galvanometer G is included.

As previously stated, the galvanometer G as its needle is deflected, effects an automatic adjustment of the potentiometer P so as to bring its circuit to balance that of the Wheatstone bridge. That is, the opposing potential from the potentiometer is adjusted by means of the wiper 6 along the slide wire resistance 7 until a balance between the two circuits W and P is secured. This adjustment of the wiper 6 to bring about the balance, shifts the pen 12 along on the paper 11, thereby extending the curve or indicating line transversely of the sheet 11 to an extent which indicates or measures the change or variation in the vacuum system. As the two instruments W and P come to a balance, the needle of the galvanometer G also comes to its central or balanced position and remains there so long as the vacuum in the system stays at this last recorded pressure. Assuming that the pen 12 has been shifted over to point 18 (which is exaggerated for clearness) and that the vacuum indicated in the system is too high, the vacuum in the system is changed in any desired manner, that is manually or automatically, thereby affecting the measuring resistance 3 to again unbalance the bridge W. Consequently the needle of the galvanometer G is shifted to effect an adjustment of the potentiometer to bring about a balance with the bridge. This movement again adjusts the pen 12 to record the adjustment, that is, the change in vacuum. It will thus be apparent that with the vacuum system exhausted to the proper degree and so long as it remains in that condition, the pen 12 will remain stationary, so that as the paper 11 is moved along it indicates a straight line or no variation in pressure. However, as soon as any variation in the vacuum occurs, this variation is recorded on the chart 11, the pen 12 shifting to the left or right according to the rise or fall in vacuum and the resulting right or left hand deflection of the needle in the galvanometer G.

As previously stated, I show means for recording the temperature of the oven on the same chart 11, and to this end the switch 16, operated in synchronism with potentiometer record sheet 11, is shifted to alternately cut in the thermo-couple TC and the vacuum measuring apparatus, thereby alternately measuring and recording both on the same chart 11. The thermo-couple TC when cut in through the switch 16, acts in conjunction with the potentiometer P the same as the Wheatstone bridge W, that is, it sets up a counter electro-motive force which varies with the temperature in the oven and the potentiometer automatically adjusts itself into balance with the thermo-couple and thereby shifts the pen 12 to record the variations in oven temperature. The switch 16 is so operated by its cam 19 as to, for example, maintain the vacuum measuring apparatus in circuit for thirty-five seconds and the thermo-couple circuit for twenty-five seconds, so that the chart will readily show by its indicating line or curve that part which records the vacuum and that part which records the oven temperature.

As to the oven door switch 17, this is arranged to be shifted when the oven door is opened for gaining access to the lamps, so as to cut out the oven temperature recording apparatus and keep the vacuum measuring apparatus continually connected. This is desirable because the oven door is opened when the lamps are to be removed or inserted, and at this time the temperature is of no consequence, that is, so far as the recording is concerned. But the vacuum measurements are continued because at this time, that is, while the lamps are being worked on, it is of great importance to watch the vacuum and keep a record because of the danger of sudden changes in vacuum while working on the lamps.

What is claimed is:

1. In an apparatus for measuring gas pressures in the evacuation of incandescent lamps, means for heating the lamps to be evacuated, a standard resistance tube spaced a predetermined distance from the heating means, a second resistance tube equally spaced from the heating means and connected to the lamps to be evacuated, and means for measuring the difference in resistance between the standard resistance tube and the second mentioned resistance tube.

2. In an apparatus for measuring gas pressures in the evacuation of incandescent lamps, an oven for heating the lamps to be evacuated, a Wheatstone bridge comprising a pair of resistance tubes equally spaced from the oven, one of said tubes being connected to the lamps to be evacuated, a pair of resistance coils equally spaced from the oven, and means responsive to a relative variation in the resistance of the resistance tubes to measure the gas pressure in the lamps.

3. In an apparatus for measuring gas pressures in the evacuation of incandescent lamps, an oven for heating the lamps to be evacuated, a measuring resistance, a tube confining the measuring resistance connected to the lamps and spaced a predetermined distance from the oven, a standard resistance, a tube confining the standard resistance and mounted an equal distance from the oven as the first mentioned tube, and means responsive to the relative variation of the resistances to measure the gas pressure in the lamps.

4. In an apparatus for measuring gas pressures in the evacuation of incandescent lamps, means for heating the lamps to be evacuated, a pair of electrical resistance elements positioned at an equal and predetermined distance from the heating means, a tube enclosing one of the resistance elements and communicating with the lamps to be evacuated, and means for measuring the difference in resistance between the resistance elements.

5. In an apparatus for measuring gas pressures in the evacuation of incandescent lamps, means for heating the lamps to be evacuated, a pair of resistance elements equally spaced from the heating means, means enclosing one of the resistance elements and communicating with the lamps to be evacuated, and means responsive to a relative variation in the resistance of the resistance elements to measure the gas pressure in the lamps.

In witness whereof, I hereunto subscribe my name this 3d day of October A. D., 1925.

JOHN SHERMAN PEOPLES.